United States Patent
Shook et al.

(10) Patent No.: US 12,241,418 B2
(45) Date of Patent: Mar. 4, 2025

(54) DEDICATED THERMAL RECIRCULATION CONTROL

(71) Applicant: Hamilton Sundstrand Corporation, Charlotte, NC (US)

(72) Inventors: Ryan Shook, Loves Park, IL (US); Ryan Prescott Susca, Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/224,718

(22) Filed: Jul. 21, 2023

(65) Prior Publication Data

US 2025/0027451 A1    Jan. 23, 2025

(51) Int. Cl.
| | |
|---|---|
| F02C 7/224 | (2006.01) |
| F02C 7/236 | (2006.01) |
| F02C 9/26 | (2006.01) |
| F02C 9/30 | (2006.01) |
| F02C 7/14 | (2006.01) |

(52) U.S. Cl.
CPC .............. *F02C 7/224* (2013.01); *F02C 7/236* (2013.01); *F02C 9/263* (2013.01); *F02C 9/30* (2013.01); *F02C 7/14* (2013.01)

(58) Field of Classification Search
CPC .............................. F02C 7/224; F05D 2270/64
See application file for complete search history.

(56) References Cited

U.S. PATENT DOCUMENTS

| | | | |
|---|---|---|---|
| 3,779,007 A | 12/1973 | Lavash | |
| 4,505,124 A | 3/1985 | Mayer | |
| 2007/0051089 A1 | 3/2007 | Lewis | |
| 2015/0151845 A1 | 6/2015 | Jones | |
| 2019/0170065 A1* | 6/2019 | Angevin | ................ F15B 13/06 |
| 2021/0229827 A1 | 7/2021 | Doman | |
| 2022/0243659 A1 | 8/2022 | Hinderliter | |
| 2023/0279813 A1* | 9/2023 | Mochrie | ................ F02C 7/228 |
| | | | 60/730 |

OTHER PUBLICATIONS

Extended European Search Report for EP Application No. 24190058.8, dated Dec. 23, 2024, 8 pages.

* cited by examiner

*Primary Examiner* — Todd E Manahan
*Assistant Examiner* — Alyson Joan Harrington
(74) *Attorney, Agent, or Firm* — Kinney & Lange, P.A.

(57) ABSTRACT

A system includes a main supply line and a thermal recirculation pump in fluid communication with the main supply line for supplying the thermal recirculation pump. The thermal recirculation pump is connected in fluid communication with a thermal recirculation line for providing fluid at an elevated pressure to the thermal recirculation line relative to the main supply line. A thermal recirculation control is connected in fluid communication to be supplied from the thermal recirculation line. A cooler system of one or more coolers is connected in fluid communication with a cooler supply line of the thermal recirculation control.

20 Claims, 2 Drawing Sheets

DEDICATED THERMAL RECIRCULATION CONTROL

BACKGROUND

1. Field

The present disclosure relates to fuel systems, and more particularly to control of flow through coolers in fuel systems such as for use in aircraft.

2. Description of Related Art

Modern aircraft use the engine fuel system for capturing parasitic energy losses through the use of fuel as a cooling medium. The engine fuel pumps are responsible, generally, for moving this fuel around the fuel system. Traditional engine mounted coolers placed upstream of airframe mounted coolers drive the total pressure requirements of the pump to be very high. This requires increased mechanical loads to drive the pumps, and thereby increases the total parasitic energy loss the system has as a whole.

The conventional techniques have been considered satisfactory for their intended purpose. However, there is an ever present need for improved systems and methods for cooler control in fuel systems. This disclosure provides a solution for this need.

SUMMARY

A system includes a main supply line and a thermal recirculation pump in fluid communication with the main supply line for supplying the thermal recirculation pump. The thermal recirculation pump is connected in fluid communication with a thermal recirculation line for providing fluid at an elevated pressure to the thermal recirculation line relative to the main supply line. A thermal recirculation control is connected in fluid communication to be supplied from the thermal recirculation line. A cooler system of one or more coolers is connected in fluid communication with a cooler supply line of the thermal recirculation control.

A boost pump can be connected in fluid communication between a supply and the main supply line upstream of an inlet line for supplying the thermal recirculation pump and one or more gas generator systems supplied by the main supply line. An actuation system can be connected in fluid communication to be supplied from the main supply line at a point upstream from the thermal recirculation pump. A wash screen can be included in the main supply line, configured to filter flow entering an actuation system through a screen, and configured to wash the screen with flow through the main supply line.

A variable displacement pump (VDP) of the actuation system can be connected in fluid communication to receive fluid from the main supply line through the wash screen, and to supply pressurized flow to an actuation outlet line. The VDP can includes a variable displacement mechanism to control output pressure of the VDP. An actuator can be operatively connected for direct control of the variable displacement mechanism. A pressure sensor can be operatively connected to the actuation outlet line to generate feedback indicative of pressure in the outlet line. A controller can be operatively connected to receive the feedback from the pressure sensor, and operatively connected to the actuator to control the variable displacement mechanism based on the feedback. The actuator can include an electro-hydraulic servo valve (EHSV) having a control port connected in fluid communication with the variable displacement mechanism by a VDP control line for control of flow through the VDP. The EHSV can be connected in fluid communication with both the inlet line and with the actuation outlet line through respective connection lines. The EHSV can be operatively connected to the controller for active control of the EHSV to actuate the variable displacement mechanism based on the feedback. An electromechanical actuator (EMA) can be operatively connected to actuate the variable displacement mechanism, wherein the EMA is operatively connected to the controller for direct control of the variable displacement mechanism based on the feedback to support flow demands from one or more downstream systems. A check valve (CV) can be included in the actuation outlet line, configured to block backflow in the actuation outlet line from flowing back to the VDP.

An augmentor pump/fuel control component can be connected in fluid communication with the main supply line downstream of the wash screen, wherein the augmentor pump/fuel control component can be configured to supply fuel flow from the main supply line to a downstream augmentor. A selector valve (SV) can be included in the actuation outlet line. A backup line can connect in fluid communication between the SV and the augmentor pump/fuel control component. The selector valve can be configured to select flow through the actuation outlet line to actuation loads in a normal operation mode, and to supply the actuation loads from the augmentor pump/fuel control component in a backup operation mode. The SV can be downstream of the CV in the actuation outlet line.

A filter can be included in the main supply line downstream of the wash screen for filtering flow washing the wash screen. The filter can be upstream of the augmentor pump/fuel control component. The inlet line can be a branch of the main supply line connecting the thermal recirculation pump in fluid communication to be supplied from the main supply line. The branch can connect to the main supply line downstream of the filter and upstream of the augmentor pump/fuel control component. A main fuel control component can be connected to be supplied by the main supply line. The main fuel control component can be connected in fluid communication to supply one or more downstream gas generators. A backup line can connect the gas generators in fluid communication with the augmentor pump/fuel control component for backup.

The cooler system can be connected in fluid communication with a cooler return line that connects the one or more coolers to the main supply line between the wash screen and the filter. The thermal recirculation control cab include one or more cooler metering valves in fluid communication between the thermal recirculation line and the cooler supply line, the one or more cooler metering valves being configured to meter flow to the one or more coolers. The one or more cooler metering valves can include two or more cooler metering valves connected in parallel with one another to supply two or more coolers. The thermal recirculation control can include a tank return metering valve connecting in fluid communication between the thermal recirculation line and the return line configured to step pressure down from the thermal recirculation line to a tank return line. A supply tank can be connected in fluid communication to receive flow from the tank return line, and to supply the boost pump.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
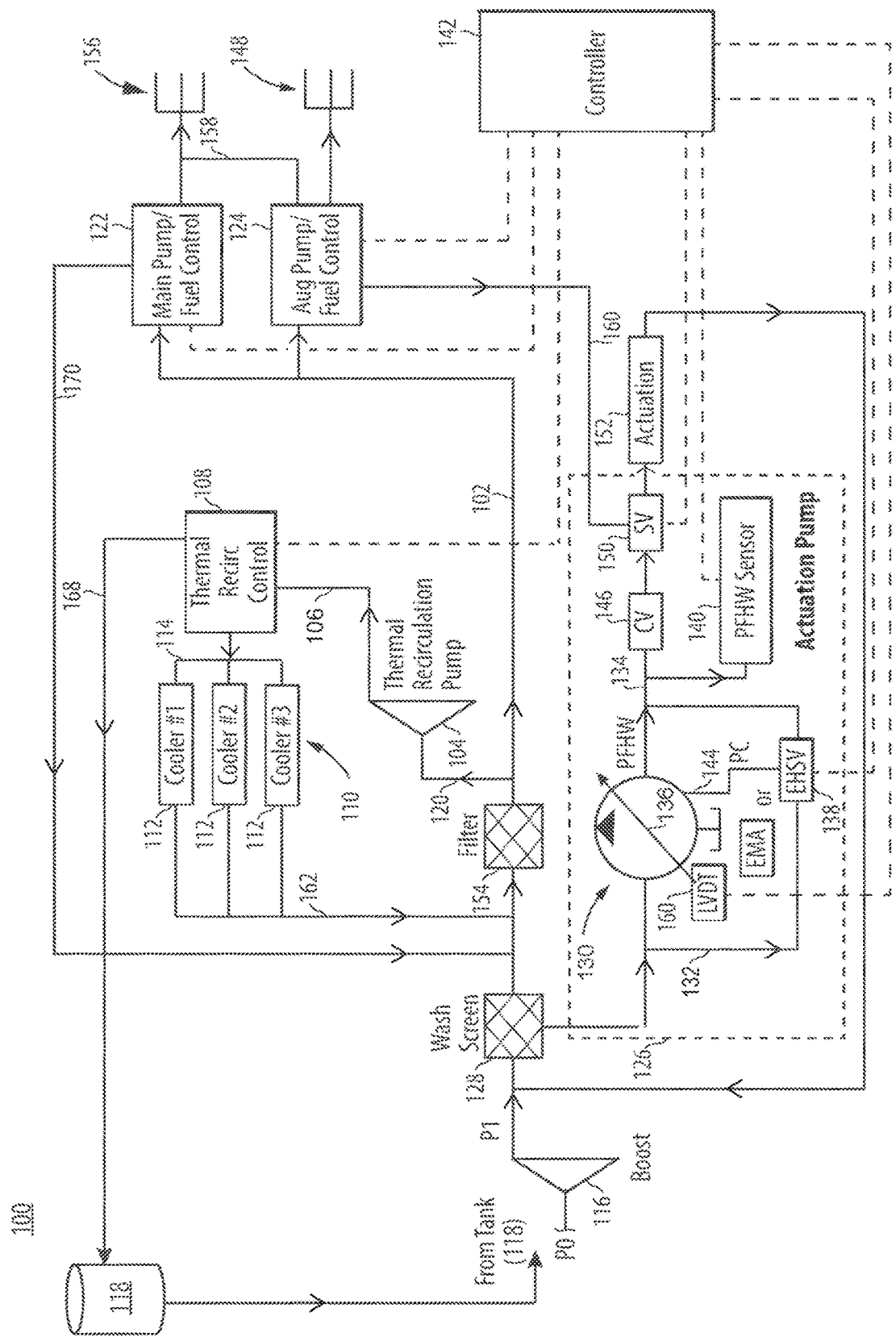
FIG. 1 is a schematic view of an embodiment of a system constructed in accordance with the present disclosure, showing the interconnections of the actuation system, the augmentor pump/fuel control component, the main fuel control component, and the thermal recirculation control.
Figure 2:
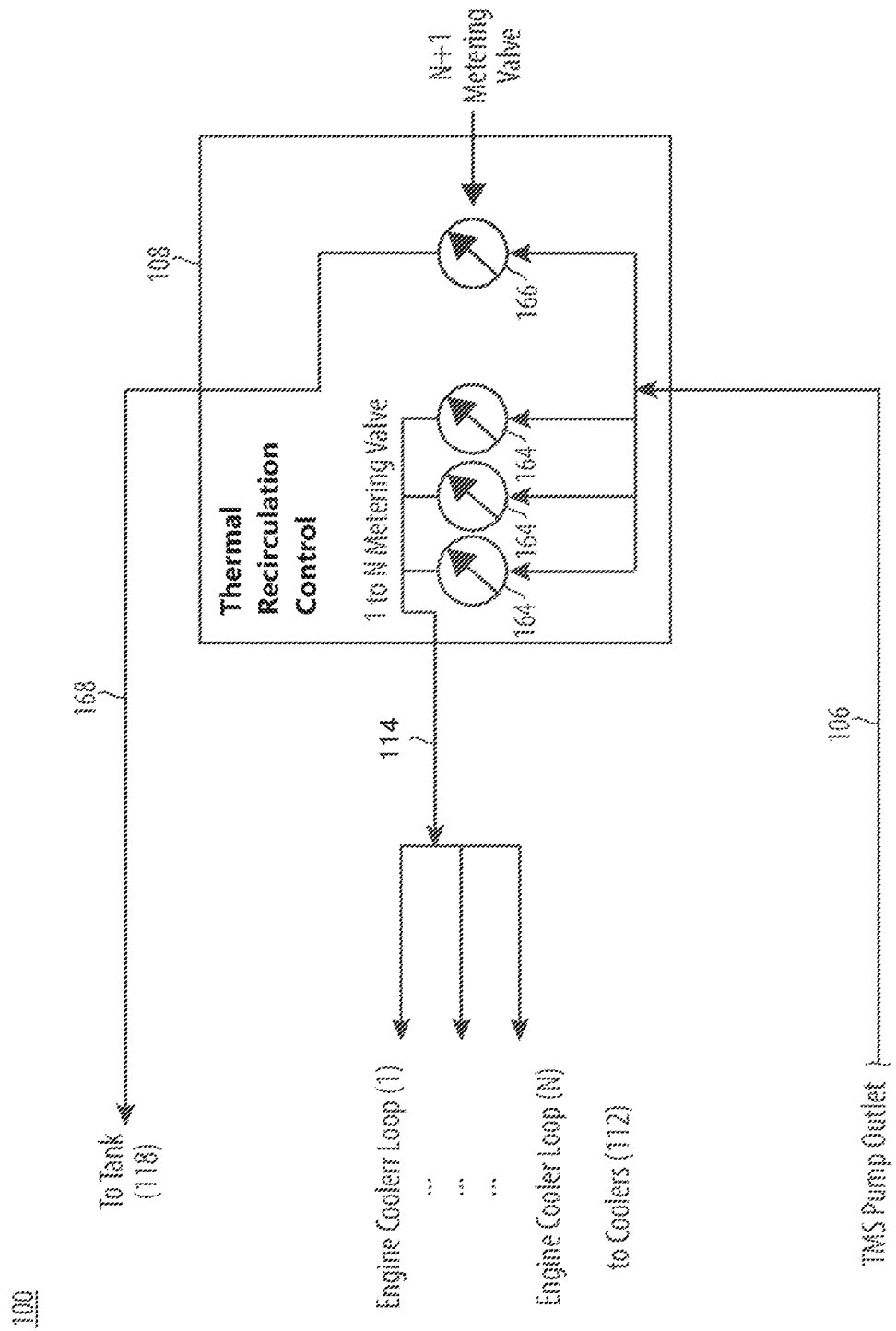
FIG. 2 is a schematic view of the thermal recirculation control of FIG. 1, showing the parallel metering valves.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments or aspects are shown in FIG. 2 as will be described. The systems and methods described herein can be used to reduce the weight of fuel systems and reducing pump rise required for thermal management system (TMS) pump, reducing parasitic power, compared to more traditional systems.

A system 100 includes a main supply line 102 and a thermal recirculation pump 104, e.g. a fixed displacement pump, in fluid communication with the main supply line 102 for supplying the thermal recirculation pump 104 with fluid from the main supply line 102. The thermal recirculation pump 104 is connected in fluid communication with a thermal recirculation line 106 for providing fluid at an elevated pressure to the thermal recirculation line 106 relative to the pressure in the main supply line 102. A thermal recirculation control 108 is connected in fluid communication to be supplied from the thermal recirculation line 106. A cooler system 110 of one or more coolers 112 is connected in fluid communication with a cooler supply line 114 of the thermal recirculation control 108. The cooler system 110 is connected in fluid communication with a cooler return line 162 that connects the one or more coolers 112 to the main supply line 102 between the wash screen 128 and the filter 154.

A boost pump 116 is connected in fluid communication between a supply, i.e. the fuel tank 118, and the main supply line 102 upstream of an inlet line 120 that supplies the thermal recirculation pump 104, which is upstream in the main supply line 102 from one or more gas generator systems 122, 124 supplied by the main supply line 102. An actuation system 126 is connected in fluid communication to be supplied from the main supply line 102 at a point upstream from the thermal recirculation pump 104. A wash screen 128 is included in the main supply line 102, configured to filter flow entering an actuation system 126 through a screen, and configured to wash the screen with flow through the main supply line 102.

A variable displacement pump (VDP) 130 of the actuation system is connected in fluid communication to receive fluid from the main supply line 102 through the wash screen 128 and an inlet line 132, and to supply pressurized flow to an actuation outlet line 134. The VDP 130 includes a variable displacement mechanism 136 to control output pressure of the VDP 130. An actuator 138 is operatively connected for direct control of the variable displacement mechanism 136. A pressure sensor 140 is operatively connected to the actuation outlet line 134 to generate feedback indicative of pressure in the actuation outlet line 134.

A controller 142 is operatively connected to receive the feedback from the pressure sensor 138, and operatively connected to the actuator 138 to control the variable displacement mechanism 136 based on the feedback. Position feedback indicative of the position of the variable displacement mechanism 136 can be communicated from a position sensor 160, e.g. a linear variable differential transformer (LVDT) to the controller 142 for use in controlling the pressure in the actuation outlet line 134. The actuator 138 includes an electrohydraulic servo valve (EHSV) having a control port connected in fluid communication with the variable displacement mechanism 136 by a VDP control line 144 for control of flow through the VDP 130. The EHSV is connected in fluid communication with both the inlet line 132 and with the actuation outlet line 134 through respective connection lines. The EHSV is operatively connected to the controller 142 for active control of the EHSV to actuate the variable displacement mechanism 136 based on the feedback. Instead of an EHSV, it is also possible to use an electromechanical actuator (EMA), as indicated in FIG. 1, for the actuator 138. The EMA can be operatively connected to actuate the variable displacement mechanism 136, wherein the EMA is operatively connected to the controller 142 for direct control of the variable displacement mechanism 136 based on the feedback to support flow demands from one or more downstream systems. A check valve (CV) 146 is included in the actuation outlet line 134, configured to block backflow in the actuation outlet line 134 from flowing back to the VDP 130.

An augmentor pump/fuel control component 124 is connected in fluid communication with the main supply line 102 downstream of the wash screen 128. The augmentor pump/fuel control 124 is configured to supply fuel flow from the main supply line 102 to a downstream augmentor 148. A selector valve (SV) 150 connects in fluid communication to the actuation outlet line 134. A backup line 160 connects in fluid communication between the SV 150 and the augmentor pump/fuel control component 124. The selector valve 150 is configured to select flow through the actuation outlet line 134 to the actuation loads 152 in a normal operation mode, and in a backup operation mode to allow the augmentor pump/fuel control component 124 to supply the actuation loads 152 based on control from the controller 142, e.g. if the pump for the actuation loads has failed. The SV 150 is downstream of the CV 146 in the actuation outlet line 134. A filter 154 is included in the main supply line 102 downstream of the wash screen 128 for filtering flow washing the wash screen 128. The filter 154 is upstream of the augmentor pump/fuel control component 124. A main fuel control component 122 is connected to be supplied by the main supply line 102. The main fuel control component 122 is connected in fluid communication to supply one or more downstream gas generator 156. A backup line 158 connects the gas generators 156 in fluid communication with the augmentor pump/fuel control component 124 for backup.

The inlet line 120 is a branch of the main supply line 102 connecting the thermal recirculation pump 104 in fluid communication to be supplied from the main supply line 102. The branch connects to the main supply line 102 downstream of the filter 154 and upstream of the augmentor pump/fuel control component 124 and the main pump/fuel control component 122. Each of the main pump/fuel control component 122, the augmentor pump/fuel control component 124, and the thermal recirculation control 108 can be connected to be controlled by the controller 142.

With reference now to FIG. 2, the thermal recirculation control 108 includes one or more cooler metering valves 164 in fluid communication between the thermal recirculation line 106 and the cooler supply line 114, which braches to the coolers 112. Those skilled in the art will readily appreciate that while three cooler metering valves 164 are shown in FIG. 2, any number including one can be used. The one or more cooler metering valves 164 are configured to meter flow to the one or more coolers. Where more than one cooler metering valve 164 is used, the cooler metering valves 164 can all be connected in parallel with one another, all supplied from the thermal recirculation line 106, and all feeding into the cooler supply line 114 to supply the coolers 112. The thermal recirculation control 100 includes a tank return metering valve 166 connecting in fluid communication between the thermal recirculation line 106 and the return line 168 that provides a return to the tank 118. The tank return metering valve 166 is configured to step pressure down from the thermal recirculation line 106 to the tank return line 168. The supply tank 118 is connected in fluid communication to receive flow from the tank return line 168 from the thermal recirculation control 108, to receive flow from the main return line 170 from the main pump/fuel control 122, and to supply fluid to the boost pump 116.

Systems and methods as disclosed herein provide potential benefits including the following. They allow for moving all coolers into low pressure zone to reduce weight of the coolers and an aircraft housing the coolers. They can reduces pump rise required from the thermal management system pump there for reduce parasitic horsepower. Independent control of thermal recirculation flows for cooler and aircraft return-to-tank flows can allow for decoupled temperature control of respective sub loops. Using multiple metering valves (e.g. the valve or valves 164) can allow for more accurate control than using a single large metering valve, and can provide for form factor/envelope advantages.

The methods and systems of the present disclosure, as described above and shown in the drawings, provide for reducing the weight of fuel systems and reducing pump rise required for thermal management system (TMS) pump, thus reducing parasitic power, compared to more traditional systems. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
    a main supply line;
    a thermal recirculation pump in fluid communication with the main supply line for supplying the thermal recirculation pump and with a thermal recirculation line for providing fluid at an elevated pressure to the thermal recirculation line relative to the main supply line;
    a thermal recirculation control connected in fluid communication to be supplied from the thermal recirculation line;
    wherein a cooler system of one or more coolers is connected in fluid communication with a cooler supply line of the thermal recirculation control;
    a boost pump connected in fluid communication between a supply and the main supply line upstream of an inlet line for supplying the thermal recirculation pump and one or more gas generator systems supplied by the main supply line;
    an actuation system in fluid communication to be supplied from the main supply line at a point upstream from the thermal recirculation pump; and
    a wash screen in the main supply line, configured to filter flow entering the actuation system through the wash screen, and configured to wash the wash screen with flow through the main supply line.

2. The system as recited in claim 1, further comprising:
    a variable displacement pump (VDP) of the actuation system in fluid communication to receive fluid from the main supply line through the wash screen, and to supply a pressurized fluid flow to an actuation outlet line, wherein the VDP includes a variable displacement mechanism to control output pressure of the VDP; and
    an actuator operatively connected for direct control of the variable displacement mechanism.

3. The system as recited in claim 2, further comprising a pressure sensor operatively connected to the actuation outlet line to generate feedback indicative of pressure in the actuation outlet line.

4. The system as recited in claim 3, further comprising a controller operatively connected to receive the feedback from the pressure sensor, and operatively connected to the actuator to control the variable displacement mechanism based on the feedback.

5. The system as recited in claim 4, wherein the actuator includes an electrohydraulic servo valve (EHSV) having a control port connected in fluid communication with the variable displacement mechanism by a VDP control line for control of flow through the VDP, wherein the EHSV is connected in fluid communication with an actuation inlet line and with the actuation outlet line through respective connection lines, and wherein the EHSV is operatively connected to the controller for active control of the EHSV to actuate the variable displacement mechanism based on the feedback.

6. The system as recited in claim 4, further comprising an electromechanical actuator (EMA) operatively connected to actuate the variable displacement mechanism, wherein the EMA is operatively connected to the controller for direct control of the variable displacement mechanism based on the feedback to support flow demands from one or more downstream systems.

7. The system as recited in claim 4, further comprising a check valve (CV) in the actuation outlet line, configured to block backflow in the actuation outlet line from flowing back to the VDP.

8. The system as recited in claim 7, further comprising an augmentor pump/fuel control component in fluid communication with the main supply line downstream of the wash screen, wherein the augmentor pump/fuel control component is configured to supply fuel flow from the main supply line to a downstream augmentor.

9. The system as recited in claim 8, further comprising a selector valve (SV) in the actuation outlet line, wherein a backup line connects in fluid communication between the SV and the augmentor pump/fuel control component, wherein the SV is configured to select flow through the actuation outlet line to actuation loads in a normal operation mode, and to supply the actuation loads from the augmentor pump/fuel control component in a backup operation mode, wherein the SV is downstream of the CV in the actuation outlet line.

10. The system as recited in claim 9, further comprising a filter in the main supply line downstream of the wash screen for filtering flow washing the wash screen, wherein the filter is upstream of the augmentor pump/fuel control component.

11. The system as recited in claim 10, further comprising:
wherein the inlet line is a branch of the main supply line connecting the thermal recirculation pump in fluid communication to be supplied from the main supply line, wherein the branch connects to the main supply line downstream of the filter and upstream of the augmentor pump/fuel control component.

12. The system as recited in claim 11, further comprising:
a main fuel control component connected to be supplied by the main supply line, wherein the main fuel control component is connected in fluid communication to supply the one or more gas generator systems.

13. The system as recited in claim 12, wherein a backup line connects the one or more gas generator systems in fluid communication with the augmentor pump/fuel control component for backup.

14. The system as recited in claim 13, wherein the cooler system is connected in fluid communication with a cooler return line that connects the one or more coolers to the main supply line between the wash screen and the filter.

15. The system as recited in claim 14, wherein the thermal recirculation control includes one or more cooler metering valves in fluid communication between the thermal recirculation line and the cooler supply line, the one or more cooler metering valves being configured to meter flow to the one or more coolers.

16. The system as recited in claim 15, wherein the one or more cooler metering valves comprise at least two cooler metering valves that are fluidly connected in parallel with one another to supply the one or more coolers.

17. The system as recited in claim 14, wherein the thermal recirculation control includes a tank return metering valve connecting in fluid communication between the thermal recirculation line and a tank return line configured to step pressure down from the thermal recirculation line to the tank return line.

18. The system as recited in claim 17, further comprising a supply tank connected in fluid communication to receive flow from the tank return line, and to supply the boost pump.

19. A system comprising:
a main supply line;
a thermal recirculation pump in fluid communication with the main supply line for supplying the thermal recirculation pump and with a thermal recirculation line for providing fluid at an elevated pressure to the thermal recirculation line relative to the main supply line;
wherein a cooler system of one or more coolers is connected in fluid communication between a cooler supply line of the thermal recirculation control and the main supply line; and
a thermal recirculation control connected in fluid communication to be supplied from the thermal recirculation line comprising a respective metering valve for each of the one or more coolers, in fluid communication between the thermal recirculation line and the cooler supply line, each respective metering valve being configured to meter flow to a corresponding one of the one or more coolers;
a boost pump connected in fluid communication between a supply and the main supply line upstream of an inlet line for supplying the thermal recirculation pump and one or more gas generator systems supplied by the main supply line;
an actuation system in fluid communication to be supplied from the main supply line at a point upstream from the thermal recirculation pump; and
a wash screen in the main supply line, configured to filter flow entering the actuation system through the wash screen, and configured to wash the wash screen with flow through the main supply line.

20. The system as recited in claim 19, wherein the thermal recirculation control further comprises a tank return metering valve connecting in fluid communication between the thermal recirculation line and a tank return line configured to step pressure down from the thermal recirculation line to the tank return line.

* * * * *